(12) United States Patent
Sawyers

(10) Patent No.: US 9,768,709 B2
(45) Date of Patent: Sep. 19, 2017

(54) TRANSFORMER VOLTAGE REGULATION

(75) Inventor: Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1557 days.

(21) Appl. No.: 13/283,952

(22) Filed: Oct. 28, 2011

(65) Prior Publication Data

US 2013/0106372 A1  May 2, 2013

(51) Int. Cl.
*H02M 7/06* (2006.01)
*G05F 1/12* (2006.01)

(52) U.S. Cl.
CPC .............. *H02M 7/064* (2013.01); *H02M 7/06* (2013.01)

(58) Field of Classification Search
CPC ......... H02M 2001/009; H02M 3/1584; H02M 1/32; H02M 7/06; H02M 7/00; H02M 7/064; H02J 1/102; H01R 13/6675
USPC ....... 323/267; 363/65, 67–70, 125, 126, 146
See application file for complete search history.

(56) References Cited

U.S. PATENT DOCUMENTS

| | | | |
|---|---|---|---|
| 6,879,497 B2 | 4/2005 | Hua et al. | |
| 7,127,623 B2 | 10/2006 | Potega et al. | |
| 7,256,571 B1 | 8/2007 | Mimberg et al. | |
| 7,863,770 B2 | 1/2011 | Lanni et al. | |
| 7,902,800 B2 | 3/2011 | Jain et al. | |
| 2003/0123265 A1* | 7/2003 | Uchida | 363/21.12 |
| 2004/0085043 A1* | 5/2004 | Germagian et al. | 320/107 |
| 2008/0037293 A1* | 2/2008 | Jacques et al. | 363/21.03 |
| 2009/0067207 A1* | 3/2009 | Nishino | 363/126 |
| 2011/0133557 A1* | 6/2011 | Reilly | 307/66 |
| 2013/0286522 A1* | 10/2013 | Mullins et al. | 361/58 |

\* cited by examiner

*Primary Examiner* — Gustavo Rosario Benitez
(74) *Attorney, Agent, or Firm* — HP Patent Department

(57) ABSTRACT

In various embodiments, a transformer provides a voltage. A regulating circuit coupled to the transformer regulates the voltage to provide either a first voltage or a second voltage that is independent of the first voltage.

20 Claims, 6 Drawing Sheets

TRANSFORMER VOLTAGE REGULATION

BACKGROUND

Alternating current (AC) adapters are utilized by electronic devices to provide power at various voltage levels. The AC adapters may utilize step-down transformers or step-up transformers to provide the various voltage levels. A step-down transformer provisions a lower voltage relative to the AC adapter's input voltage, and a step-up transformer provisions a higher voltage relative to the AC adapter's input voltage. AC adapters are generally designed for use with particular electronic devices.

DETAILED DESCRIPTION

As previously described, alternating current (AC) adapters generally incorporate a transformer to provide a specified input voltage for an electronic device (i.e., an output voltage of the AC adapter). The input voltage may differ from one electronic device to another. This difference between the input voltages of various electronic devices prevents the use of a single AC adapter for multiple electronic devices.

In the present disclosure, apparatus, systems, and methods are disclosed that enable an AC adapter to provide various voltages to different electronic devices. An AC adapter, as described in this disclosure, may provide either a first voltage or a second voltage that is independent of the first voltage. Independent, as used herein, describes the relationship between the first voltage and second voltage. A second voltage is independent of a first voltage when it is not a multiple or a factor (i.e., an integer) of the first voltage. For example, a notebook computer may recommend an input voltage of approximately nineteen volts while a printer may recommend an input voltage of approximately thirty-two volts. These two voltages (i.e., 19V and 32V) are independent voltages as neither is a factor or multiple of the other. The provision of these independent voltages may be determined in response to connection of the AC adapter with a particular device.

Figure 1:
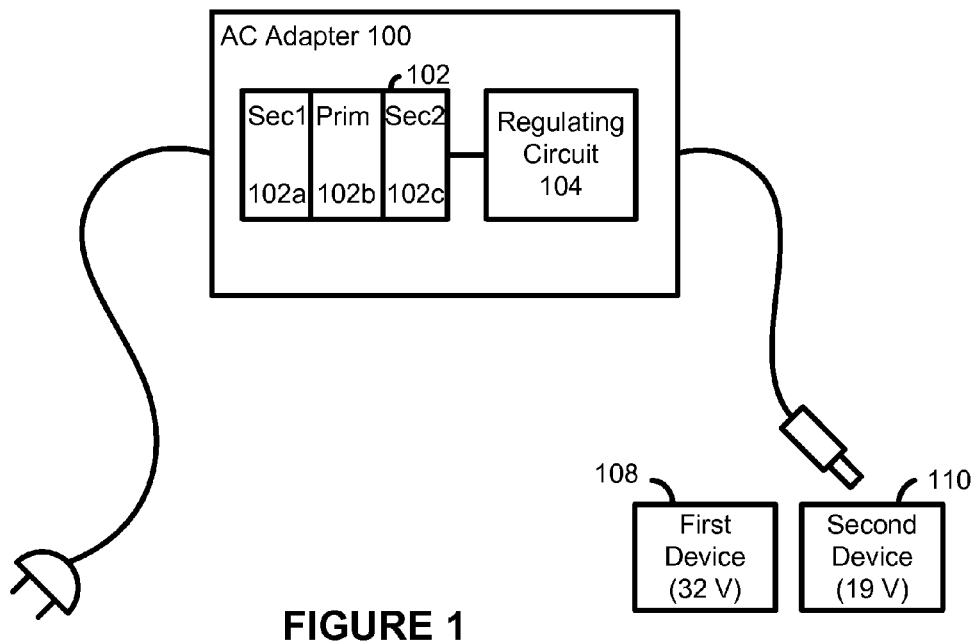
FIG. 1 is a block diagram of an apparatus in accordance with an example of the present disclosure.

FIG. 1 illustrates an AC adapter 100 in accordance with an example of the present disclosure. The AC adapter 100 includes a transformer 102 having a primary winding circuit 102b, a first secondary winding circuit 102a, and a second secondary winding circuit 102c. The transformer 102 of the AC adapter 100 is coupled to a regulating circuit 104. The AC adapter 100 is configured to provide independent voltages to either a first device 108 or alternatively a second device 110. In one example, the independent voltages may be 32V and 19V, but other independent voltages are contemplated.

Transformer 102 includes a primary winding circuit 102b that receives an input voltage to the AC adapter 100. The primary winding circuit 102b is electromagnetically coupled to the first secondary winding circuit 102a and the second secondary winding circuit 102c. The transformer 102 may be a high frequency transformer to facilitate electrical isolation between the primary winding circuit 102b and the secondary winding circuits 102a, 102c. The transformer 102 may be a step-up transformer, or alternatively, a step-down transformer. Other types of transformers are contemplated.

In various examples, the ratio of turns between the primary winding of the primary winding circuit 102b and the secondary windings of the secondary winding circuits 102a, 102c, may be designed based upon various criteria including, but not limited to, a desired output from the transformer 102. In one example, the first secondary winding (not illustrated) and the second secondary winding (not illustrated) have an equal number of turns. The equal number of turns facilitates generation of substantially equal voltages on the first secondary winding circuit 102a and the second secondary winding circuit 102c, (i.e., determined voltages). These determined voltages may then be combined and regulated by the regulating circuit 104 in various manners to produce independent voltages for the first device 108 or the second device 110.

Regulating circuit 104 is coupled to transformer 102 via the first secondary winding circuit 102a and the second secondary winding circuit 102c. The regulating circuit 104 is to regulate a voltage provided by the transformer 102 to provision either a first voltage or a second voltage that is independent of the first voltage. The output of either the first independent voltage or the second independent voltage may be based on a configuration of the first secondary winding circuit 102a relative to the second secondary winding circuit 102c. The regulating circuit 104 may include various components such as, but not limited to, solid state devices, active components, passive components, and integrated circuits.

Figure 2:
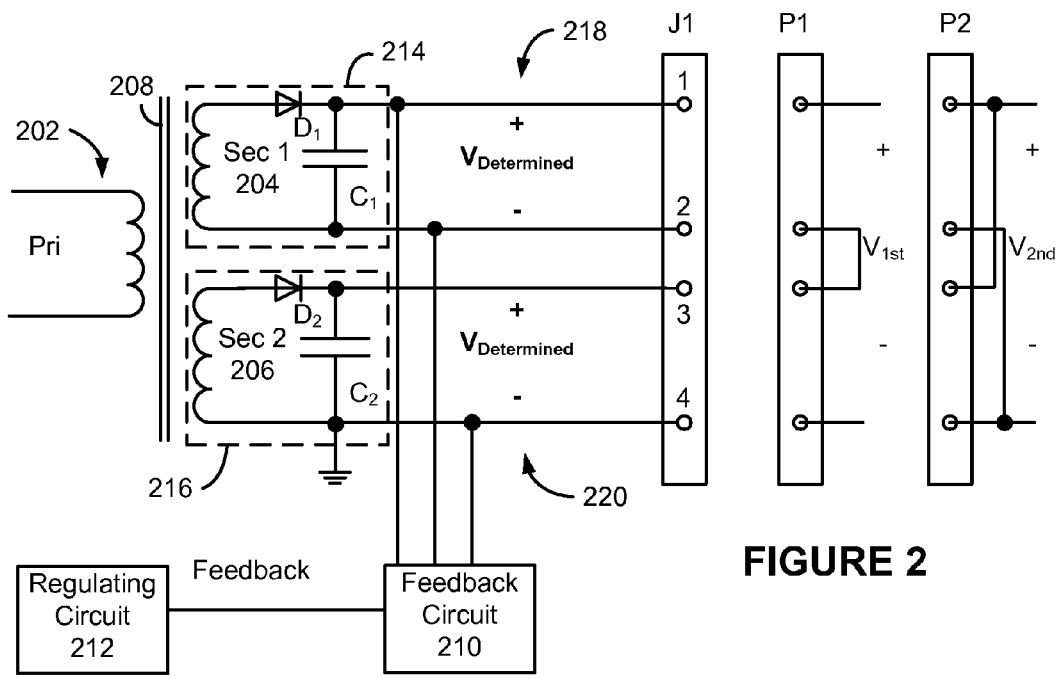
FIG. 2 is a circuit diagram of an apparatus in accordance with an example of the present disclosure.

Referring to FIG. 2, an example circuit diagram of an apparatus as illustrated FIG. 1 is shown. The circuit diagram includes various components including a primary winding 202, a first secondary winding circuit 214, a second secondary winding circuit 216, a feedback circuit 210, a regulating circuit 212, a receptacle J1 and various connectors P1, P2. The first secondary winding circuit 214 includes the first secondary winding 204, a rectifier D1, and a filter C1. Similarly, the second secondary winding circuit 216 includes the second secondary winding 206, a rectifier D2, and a filter C2. The rectifiers D1 and D2 are used to rectify a voltage produced by the windings 202, 204, and 206. Filters C1 and C2 are utilized as low pass filters. Other components may be included within the circuit without deviating from the present disclosure.

In FIG. 2, the first secondary winding 204 and second secondary winding 206 comprise an equal number of turns and are electromagnetically coupled to primary winding 202 via a magnetic core 208. Additionally, rectifier D1 is substantially similar to rectifier D2 and filter C1 is substantially similar to filter C2. Because the first secondary winding 204 and the second secondary winding 206 comprise an equal number of turns, rectifiers D1 and D2 are substantially the same, and filters C1 and C2 are substantially the same, a rectified direct current (DC) voltage produced by the first secondary winding circuit 214, illustrated as "$V_{determined}$" 218 is substantially equal to a rectified DC voltage produced by the second secondary winding circuit 216 illustrated as "$V_{determined}$" 220. That is, the first and second secondary winding circuits provide voltages that are equal, within manufacturing tolerances of the associated components. In this manner, the voltage between contacts 1 and 2 of receptacle J1 is substantially equal to the voltage between contacts 3 and 4 of receptacle J1.

Receptacle J1 is configured to couple with either connector P1 or connector P2. The connector P1 or P2 may be selected for the AC adapter based upon the AC adapter's intended use. For example, the connector may be determined or chosen based upon a need to provision power to either first device or second device. In one example, the connectors P1 or P2 may be disposed on a printed circuit board embodied within the AC adapter, such that a determination of device association is made at the time of manufacture. In another example, the connectors P1 or P2 may be disposed on a cable configured to interface with the AC adapter such that a user may associate the AC adapter with multiple devices by changing the cable. In yet another example, the connector P1 may be disposed on a printed circuit board embodied within the first device, and connector P2 deposed on a printed circuit board embodied with a second device.

Connector P1, as illustrated, is configured to couple the first secondary winding circuit 214 in series with the second secondary winding circuit 216. Once coupled in series, the feedback circuit 210 and regulating circuit 212, which may be referred to collectively as a regulator or regulating circuit, may regulate the combined voltage across the first and second secondary winding circuits 214, 216 to produce a first independent voltage "$V_{1st}$". Connector P1 may be associated with a first device, in one example, a printer.

Connector P2, as illustrated, is configured to couple the first secondary winding circuit 214 in parallel with the second secondary winding circuit 216. Once coupled in parallel, the feedback circuit 210 and regulating circuit 212 may regulate the combined voltage across the first and second secondary winding circuits 214, 216 to produce a second independent voltage "$V_{2nd}$". The second independent voltage, prior to any regulation by the feedback circuit 210 and regulating circuit 212, will be approximately half of the first voltage "$V_{1st}$" prior to any regulation, but will have twice the current capability. Various benefits associated with higher current capabilities include lower power loss and lower heat generation. Once the first and second secondary winding circuits 214, 216 have been combined, the feedback circuit 210 and regulating circuit 212 may provision first and second independent voltages. Connector P2 may be associated with a second device, in one example, a computer (e.g., notebook, desktop, netbook, etc.).

Figure 3:
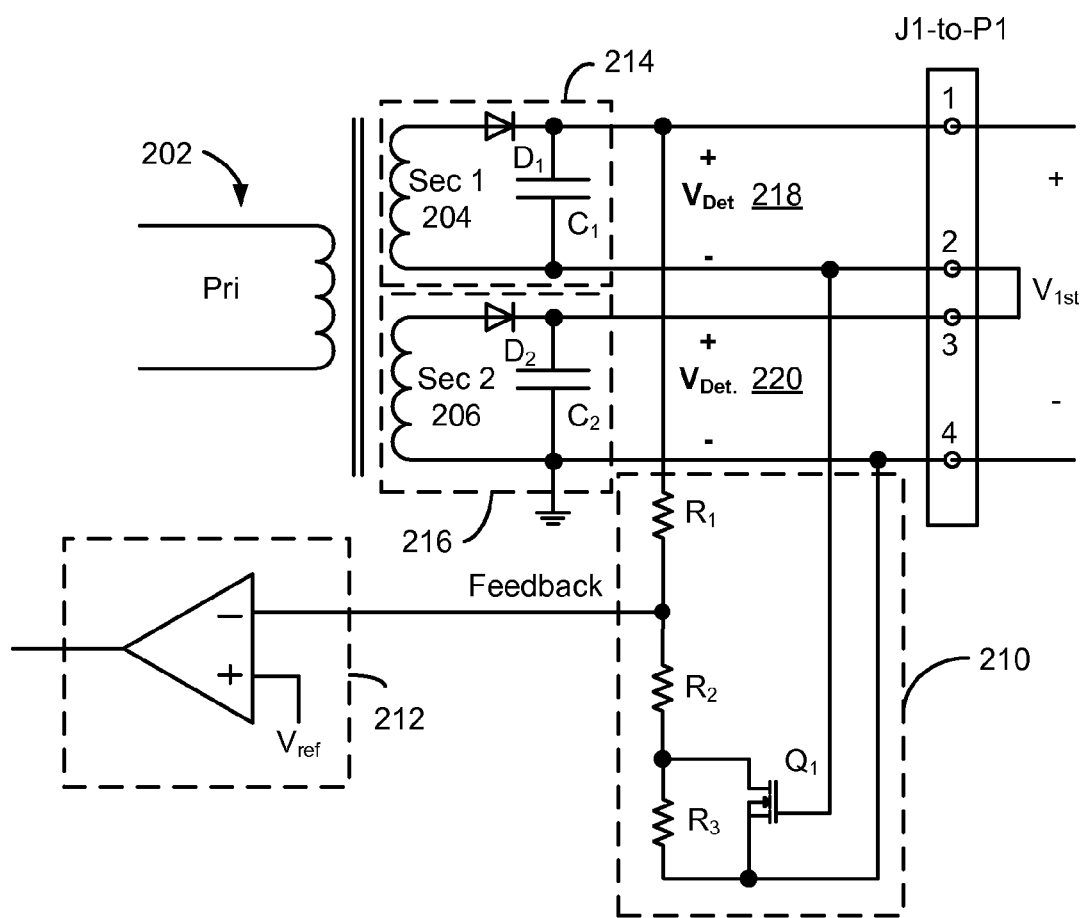
FIG. 3 is a circuit diagram of an apparatus in accordance with an example the present disclosure.

Referring to FIG. 3, an example circuit diagram is illustrated in which connector P1 is coupled to the receptacle J1, thereby coupling first secondary winding circuit 214 to the second secondary winding circuit 216. In addition, the circuit diagram includes an example of feedback circuit 210 and regulating circuit 212. As illustrated, the first secondary winding circuit 214 is coupled in series with the second secondary winding circuit 216. In response to coupling the first and second secondary winding circuits 214, 216 in series, the feedback circuit 210 and regulating circuit 212 are to modify the combination of the determined voltages 218 and 220 to produce the first independent voltage "$V_{1st}$".

As illustrated, the first independent voltage "$V_{1st}$" is taken across contacts 1 and 4, while contacts 2 and 3 are tied together. The regulating circuit 212 regulates this voltage (i.e. the combination of the two secondary windings circuits 214, 216) to produce the first independent voltage. More specifically, due to the series relationship of the first secondary winding circuit 214 and the second secondary winding circuit 216, transistor Q1 is driven from gate-to-source with half the voltage of the combination, or $V_{det}$ 220. This effectively turns on transistor Q1, which in the illustrated example is an n-channel field effect transistor (FET). Turning on transistor Q1 effectively shorts resistor R3. The remaining resistors of the feedback circuit 210, namely R1 and R2 form a voltage divider which produces the first independent voltage. In other words, the first voltage "$V_{1st}$" is equal to $((R1+R2)/R2) \times (V_{feedback})$. Generally, $V_{feedback}$ is held to a nominal value of $V_{ref}$ and is utilized to regulate power supplied to the primary winding 202. In one example, $V_{feedback}$ is held to approximately two point five volts (2.5 V), but other voltage levels are contemplated.

In one example, $V_{feedback}$ is approximately 2.5 V, R1 is approximately 118KΩ, R2=10KΩ, and R3=7.87KΩ. In this example, $V_{1st}$, the voltage output across contacts 1 and 4, is approximately equal to thirty-two volts (32 V). Thirty-two volts may be a predefined voltage for various electronic devices including, but not limited to, a printer.

Figure 4:
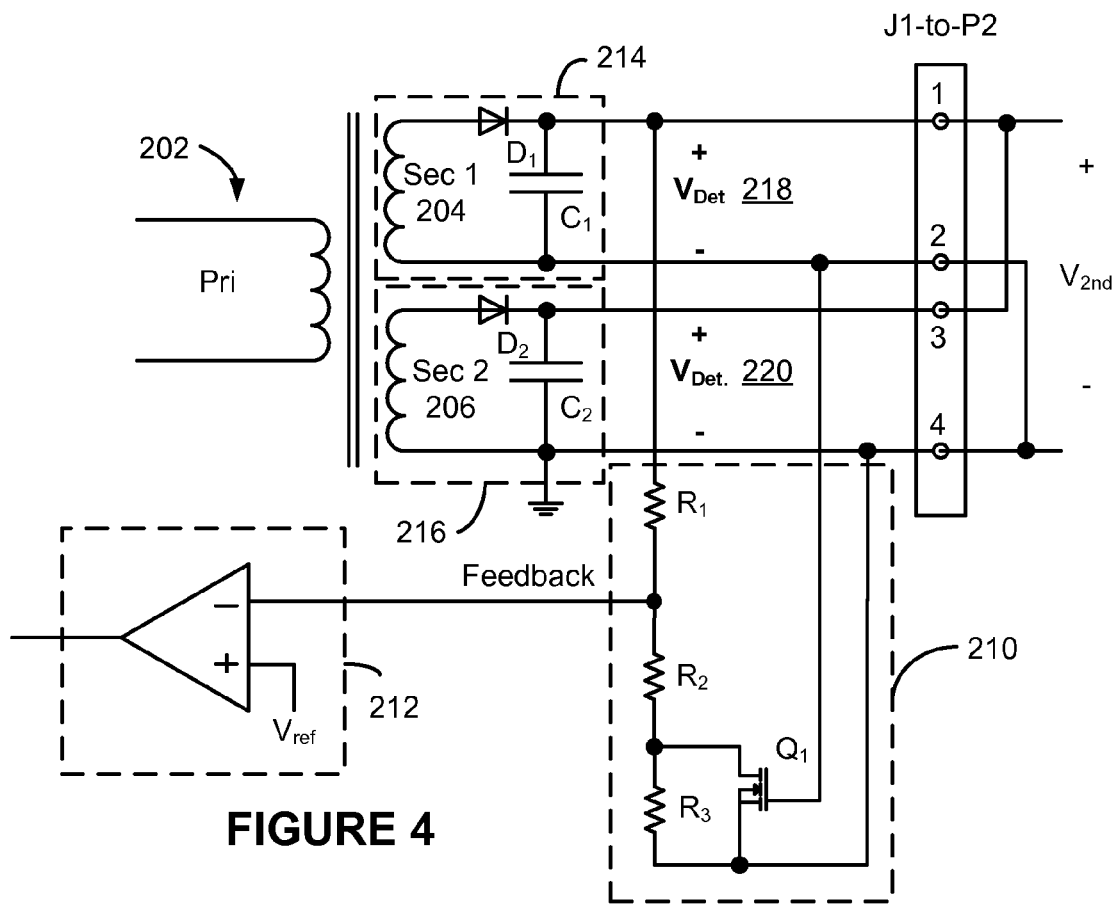
FIG. 4 is a circuit diagram of an apparatus in accordance with an example of the present disclosure.

Referring to FIG. 4, a circuit diagram is illustrated in which connector P2 is coupled to the first and second secondary winding circuits 214 and 216. As illustrated, the first secondary winding circuit 214 is coupled in parallel to the second secondary winding circuit 216. In response to coupling the first and second secondary winding circuits 214, 216 in parallel, the feedback circuit 210 and regulating circuit 212 are to modify the combination of the determined voltages 218 and 220 to produce the second independent voltage "$V_{2nd}$". The second voltage is independent of the first voltage.

As illustrated, the second independent voltage "$V_{2nd}$" is taken across contacts 1 and 4, while contacts 2 and 3 are tied, respectively, to contacts 4 and 1. In other words, contacts 2 and 3 effectively couple the first and second secondary winding circuits 214, 216 in parallel. The feedback circuit 210 and regulating circuit 212 regulate this voltage (i.e. the combination of the two determined voltages 218, 220) to produce a second independent voltage (i.e. independent of the first voltage illustrated in FIG. 3). More specifically, due to the parallel relationship of the first and second secondary winding circuits 214 and 216, transistor Q1 experiences zero volts from gate-to-source. This effectively turns off transistor Q1, which is again illustrated as an n-channel FET. The remaining resistors of the feedback circuit 210, namely R1, R2, and R3 form a voltage divider which produces the second independent voltage. In other words, the second voltage "$V_{2nd}$" is equal to $((R1+R2+R3)/(R2+R3)) \times (V_{ref})$.

Referring to the example illustrated with reference to FIG. 3, where $V_{ref}$=2.5 V, R1=118KΩ, R2=10KΩ, and R3=7.87KΩ, the voltage output across contacts 1 and 4 "$V_{2nd}$," is approximately equal to nineteen volts (19 V). Nineteen volts may be a predefined voltage for various electronic devices including but not limited to a notebook computer. In this manner, the AC adapter may provide power to various electronic devices which require voltage levels which are independent of one another.

Figure 5:
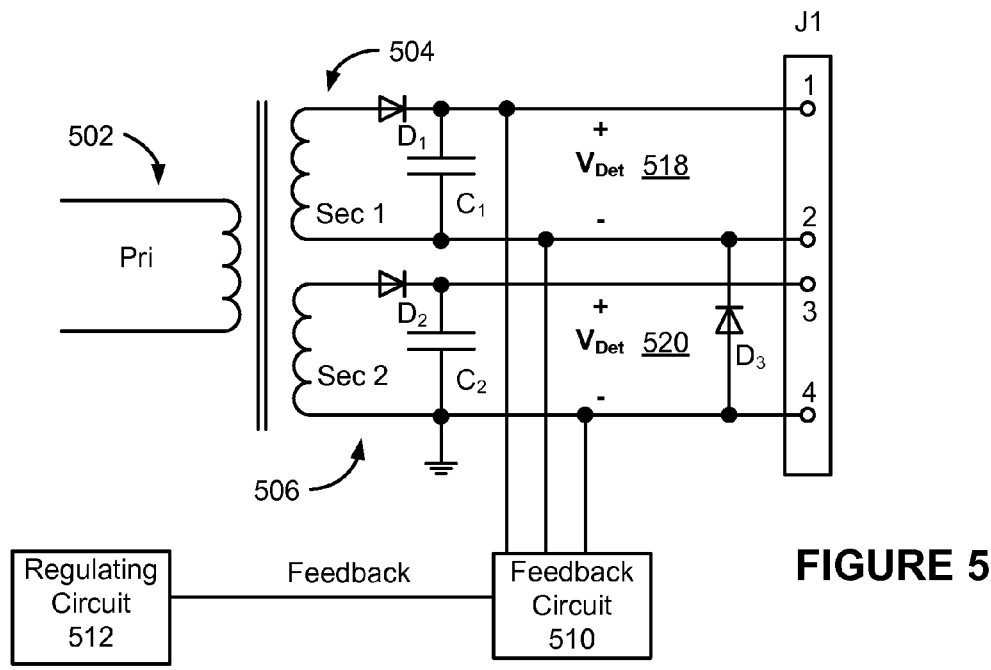
FIG. 5 is a circuit diagram of a clamp in accordance with an example of the present disclosure.
Figure 6:
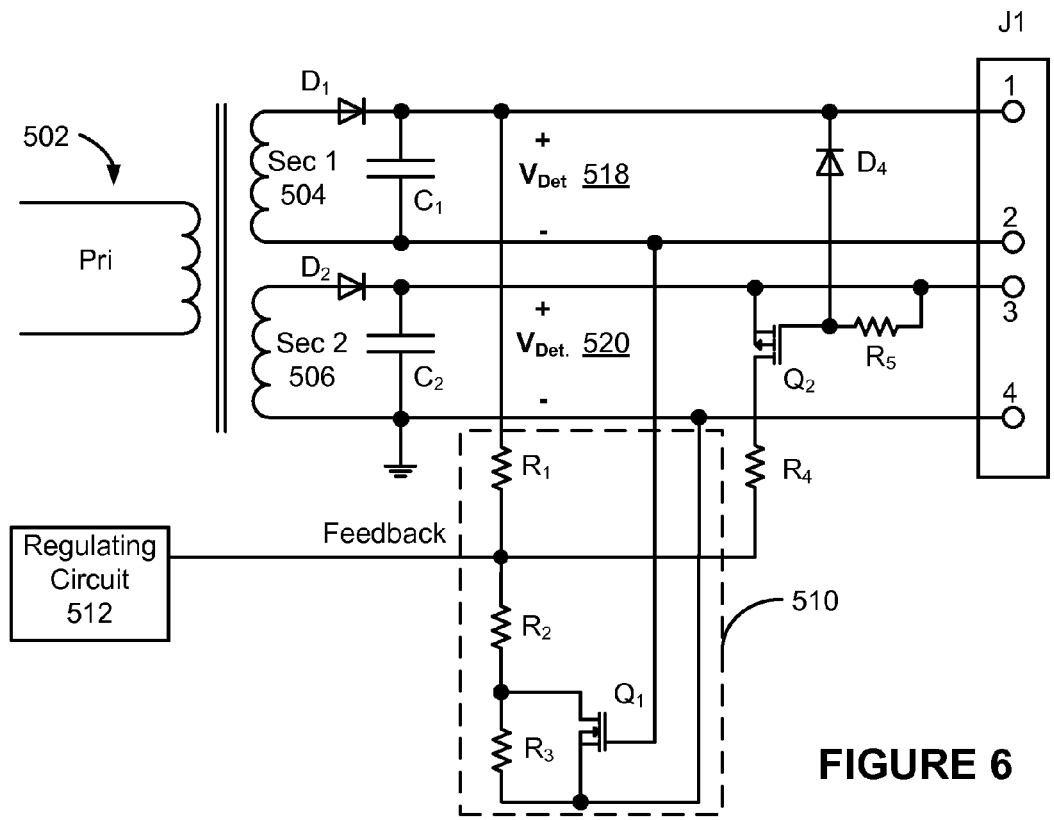
FIG. 6 is a circuit diagram of clamp in accordance with another example the present disclosure.

Referring to FIGS. 5 and 6, various control circuits, for example clamping circuits, are illustrated in combination with a transformer having primary winding 502, first and second secondary windings 504, 506, feedback circuit 510, and regulating circuit 512. The transformer, feedback circuit 510, and regulating circuit 512 may be similar to those discussed above with reference to FIGS. 1-4. The clamp circuits are to control the voltages (i.e., determined voltages) in an absence of a connector being coupled to the transformer. In other words, when contacts 1, 2, 3, and 4 are left floating and the transformer is powered, damage may occur to various components such as, but not limited to, filters C1 and C2 across the first secondary winding 504 and the second secondary winding 506, the clamp prevents such damage.

In a floating condition, the voltage difference between the first secondary winding 504 and the second secondary winding 506 may prevent the feedback circuit 510 from providing a stabilized feedback voltage to the regulating circuit 512, for example the 2.5 volts mentioned previously. More specifically, resistors R1, R2, and R3 would pull contacts 1 and 4 together, but no voltage would drop across R2 or R3. Without the feedback voltage, the primary winding 502 of the transformer may contribute to an overvoltage and damage various components of the circuit.

Referring first to FIG. 5, a first example of a clamping circuit is illustrated. A clamping circuit may be utilized to prevent damage to various components when the transformer is powered but the contacts are left floating. The first clamping circuit comprises a diode D3. The anode of the diode D3 would be coupled to contact 4 while the cathode of diode D3 would be coupled to contact 2. In this configuration, diode D3 prevents contact 2 and contact 4 from being pulled together while the power is being supplied to the primary winding 502. In another example (not illustrated), the anode of diode D3 may be coupled to contact 3 and the cathode of diode D3 to contact 1.

Referring next to FIG. 6, another example of a clamping circuit is illustrated. The clamping circuit of FIG. 6 includes a diode D4, resistors R4, R5, and transistor Q2, which is illustrated as a p-channel FET, but in other embodiments may be a PNP transistor. In this configuration, if diode D4 and transistor Q2 are on, the resistor R4 sums current into resistor R2 of the feedback circuit 510. This enables the voltage to be regulated to a desired lower voltage. In various examples, the value of R4 may be chosen to charge the capacitors across the first and second secondary windings 504 and 506 to a desired level of one half of the first independent voltage level, wherein the first independent voltage level is higher than the second independent voltage level.

In the example of the circuit being combined with a printer and notebook, the capacitors may be pre-charged to approximately sixteen volts. Consequently, if connected to a printer, thereby placing the DC rectified voltages "$V_{Det}$" 518, 520 in series, the voltage is 32 volts. If connected to a notebook, thereby placing the DC rectified voltages "$V_{Det}$" 518, 520 in parallel, the voltage would be approximately 16 volts. This may prevent any damage from plugging a powered AC adapter into a device. For example, had the filters C1 and C2 been pre-charged to 19V, then a series connection would have presented a higher than desired voltage to a printer, e.g. approximately 38 volts.

The same method may be used to precharge the voltage to some independent lower voltage. Still with reference to FIG. 6, if the resistor R4 is zero Ohms, the feedback voltage "$V_{feedback}$" is nearly short circuited to contact 3. In this example, the regulating circuit 512 would pre-charge the capacitors to approximately $V_{ref}$=2.5V, which would greatly reduce the potential inrush current when a connector is mated to an uncharged capacitive load. This method may be used for the purpose of inrush current control.

Figure 7:
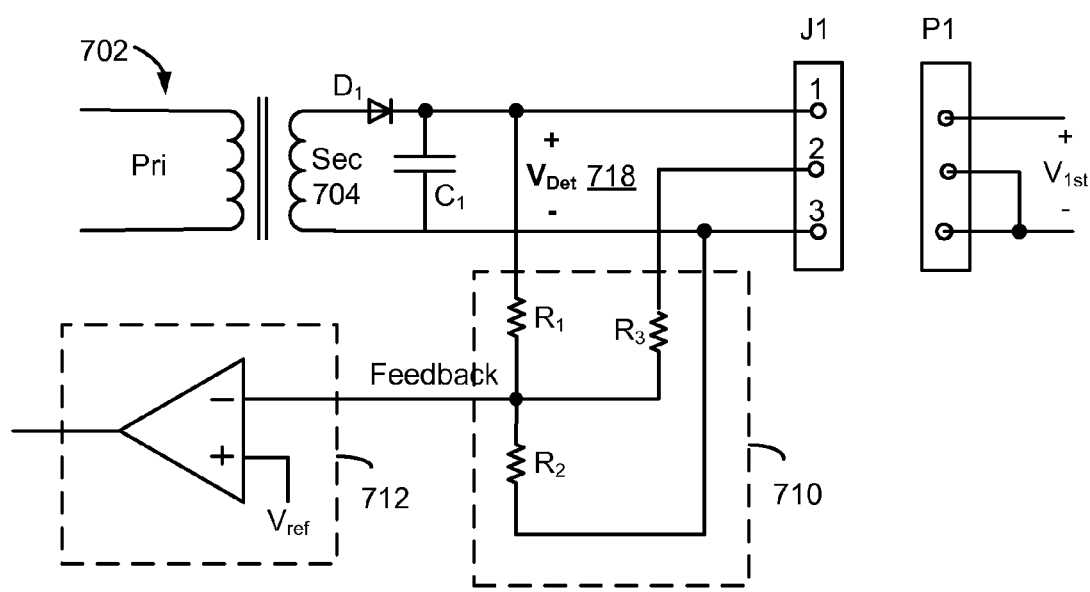
FIG. 7 is a circuit diagram of another apparatus in accordance with an example of the present disclosure.

Referring to FIG. 7, another example circuit is illustrated in which the potential inrush current is controlled. When receptacle J1 is mated with connector P1, the output voltage "$V_{1st}$" is determined resistors R1, R2, R3, and $V_{ref}$. Conversely, when receptacle J1 is left floating, the precharge voltage across filter C1 is determined by R1, R2, and $V_{ref}$.

Figure 8:
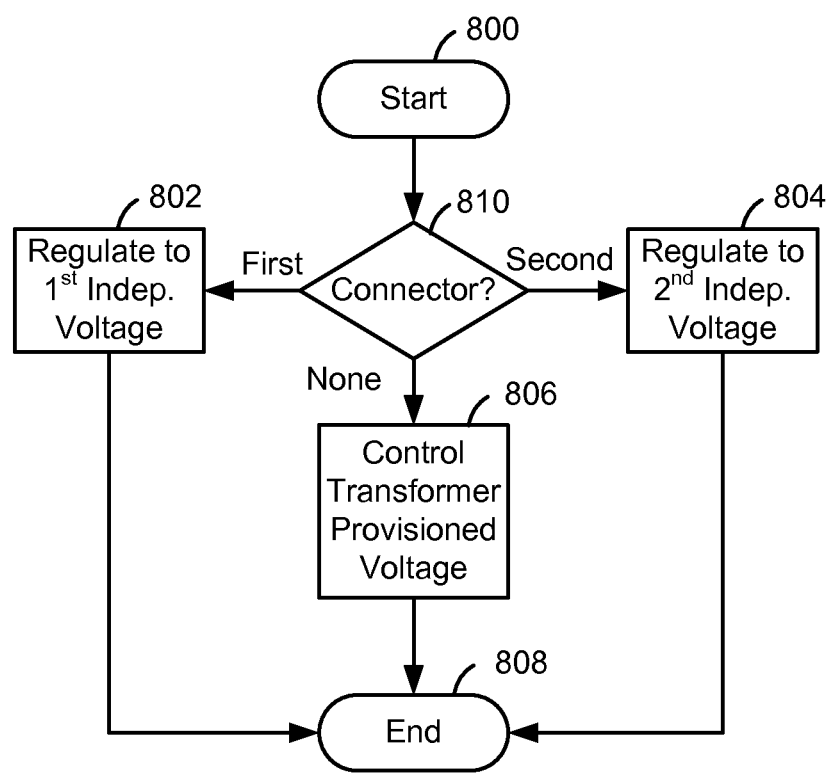
FIG. 8 is a flow diagram of an example operation in accordance with the present disclosure.

Referring to FIG. 8 a flow diagram of an example operation associated with an apparatus is illustrated. The flow diagram may be associated with any of the apparatuses described with reference to FIGS. 1-6. While illustrated and discussed in a particular order, the disclosure is not so limited. The flow diagram may reference a power circuit. A power circuit is a circuit configured to provision power to a device. A power circuit may include components discussed with reference to the previous figures including, but not limited to, transformers, regulating circuits, feedback circuits, and clamping circuits.

At 800 the method may begin and progress to 810 where a determination is made as to the type of connector coupled to the AC adapter. In various examples, the determination may occur automatically upon receipt of a connector. For example, receiving the first connector may comprise receiving a connector that couples the first secondary winding circuit of the transformer in series with the second secondary winding circuit. In response to receipt of a connector associated with a first device, for example a connector P1 as illustrated in FIG. 2, the power circuit may regulate the transformer provisioned voltage to a first independent voltage. In one example, regulating the transformer provisioned voltage may comprise regulating the transformer provisioned voltage to approximately thirty-two volts (e.g., +/−3%). Upon provisioning the first independent voltage, the method may end at 708.

Returning to 810, in response to receipt of a connector associated with a second device that is different than the first device, for example a connector P2 as illustrated in FIG. 3, the power circuit may regulate the transformer provisioned voltage to a second independent voltage. Receipt of the second connector may couple the first secondary winding circuit of the transformer in parallel with the second secondary winding circuit of the transformer. In one example, in response to receipt of the second connector, the power circuit may regulate the transformer provisioned voltage to approximately nineteen volts (e.g., +/−3%). Upon provisioning the second independent voltage, the method may then end at 708.

Returning to 810, in response to an absence of either the connector associated with the first device or the connector associated with the second device (i.e., the absence of a mating connector), the power circuit may control the transformer provisioned circuit. Controlling the transformer provisioned voltage, in various examples, may include maintaining a feedback voltage from the first and second secondary winding circuits to the primary winding. The power circuit may maintain the feedback voltage via a clamping circuit, such as one of the clamping circuits described with reference to FIG. 6. The transformer provisioned voltage may be regulated to a voltage related to the first or second independent voltages, or to a third independent voltage.

While FIG. 8 is described with reference to receipt of various connectors associated with independent devices. It is also noted that such a power circuit may provision a first independent voltage for a period of time, and subsequently, a second independent voltage for a period of time. For example, a power circuit could be coupled to a first connector, which couples the first and second secondary winding circuits in series, and regulate the transformer provisioned voltage to provide a first independent voltage. The power circuit may continually provide the first independent voltage while the power circuit is operatively coupled to an associated device. Subsequently, the power circuit may be disconnected from the associated device and operatively coupled to a second device, via a second connector. The second connector may couple the first and second secondary winding circuits in parallel, and regulate the transformer provisioned voltage to a second independent voltage. The power circuit may then continually provide the second independent voltage while operatively coupled to the second device. In between coupling the power circuit to the various devices, the power circuit may control the transformer provisioned voltage.

Controlling the transformer provisioned voltage may comprise maintaining the feedback voltage in the absence of a connector coupled to a receptacle. In another example, controlling the transformer provisioned voltage may comprise clamping, by the power circuit, the transformer provisioned voltage to half of the first independent voltage, wherein the first independent voltage is higher than the second independent voltage. This may prevent damage when a powered AC adapter is coupled to a device. In yet another example, controlling the transformer provisioned voltage may include clamping the transformer provisioned voltage to the second independent voltage when the second independent voltage is less than the first independent voltage. This may also prevent damage upon coupling a powered AC adapter to a device.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. An apparatus, comprising:
   a transformer having a first secondary winding circuit and a second secondary winding circuit, wherein the first secondary winding circuit and the second secondary winding circuit are each to provide a determined voltage;
   output contacts; and
   a regulating circuit coupled to the transformer, wherein the regulating circuit is to regulate the transformer to;
      provide a first voltage if the output contacts are coupled to a first connector, and
      provide a second voltage if the output contacts are coupled to a second connector, wherein the second voltage is independent of the first voltage.

2. The apparatus of claim 1, wherein the first secondary winding circuit and the second secondary winding circuit are coupled in series through the first connector, wherein the first connector is associated with a first device.

3. The apparatus of claim 1, wherein the first secondary winding circuit and the second secondary winding circuit are coupled in parallel through the second connector, wherein the second connector is associated with a second device.

4. The apparatus of claim 1, wherein the regulating circuit is to regulate an output voltage of the transformer to generate approximately thirty-two volts (32V) or approximately nineteen volts (19V).

5. The apparatus of claim 1, further comprising:
   a clamp coupled to the transformer, wherein the clamp is to control the determined voltages if neither the first connector nor the second connector is coupled to the output contacts of the apparatus.

6. The apparatus of claim 1, wherein a configuration of the first secondary winding circuit relative to the second secondary winding circuit is modified by coupling the first connector or the second connector to the output contacts of the apparatus.

7. A method, comprising:
   regulating, by a power circuit of a particular device, a transformer provisioned voltage to a first independent voltage if a first connector associated with a first device is coupled to output contacts of the particular device;
   regulating, by the power circuit, the transformer provisioned voltage to a second independent voltage if a second connector associated with a second device that is different than the first device is coupled to the output contacts; and
   controlling, by the power circuit, the transformer provisioned voltage if the output contacts are not coupled to either the first connector associated with the first device or the second connector associated with the second device.

8. The method of claim 7, wherein regulating the transformer provisioned voltage to the first independent voltage comprises regulating the transformer provisioned voltage to approximately thirty-two volts (32 V).

9. The method of claim 7, wherein regulating the transformer provisioned voltage to the second independent voltage comprises regulating the transformer provisioned voltage to approximately nineteen volts (19 V).

10. The method of claim 7, wherein the first connector associated with the first device couples a first secondary winding of the transformer in series with a second secondary winding of the transformer.

11. The method of claim 7, wherein the second connector associated with the second device couples a first secondary winding circuit of the transformer in parallel with a second secondary winding circuit the transformer.

12. The method of claim 7, wherein controlling the transformer provisioned voltage comprises maintaining, by the power circuit, a feedback voltage.

13. The method of claim 7, wherein controlling the transformer provisioned voltage comprises clamping, by the power circuit, the transformer provisioned voltage to half of the first independent voltage, the first independent voltage being higher than the second independent voltage.

14. The method of claim 7, wherein controlling the transformer provisioned voltage comprises clamping, by the power circuit, the transformer provisioned voltage to the second independent voltage, the second independent voltage being less than the first independent voltage.

15. A system comprising:
   a first secondary winding circuit of a transformer to provide a first voltage;
   a second secondary winding circuit of the transformer to provide a second voltage, wherein the first voltage is substantially equal to the second voltage;
   output contacts; and
   a regulating circuit coupled to the first secondary winding circuit and the second secondary winding circuit, wherein the regulating circuit is to regulate a voltage generated by a series or parallel combination of the first secondary winding circuit and the second secondary winding circuit to;

generate a first device voltage if the output contacts are coupled to a first connector; and generate a second device voltage if the output contacts are coupled to a second connector, wherein the first device voltage is independent of the second device voltage.

16. The system of claim 15, wherein the first device voltage is approximately thirty-two volts (32V) and the second device voltage is approximately nineteen volts (19V).

17. The system of claim 15, further comprising:
a control circuit coupled to the regulating circuit, wherein the control circuit is to prevent an over-voltage on either the first secondary winding circuit or the second secondary winding circuit if a connector is not coupled to the system.

18. The system of claim 15, wherein the first connector is to couple the first secondary winding circuit and the second secondary winding circuit in series to generate the first device voltage.

19. The system of claim 15, a wherein the second connector is to couple the first secondary winding circuit and the second secondary winding circuit in parallel to generate the second device voltage.

20. The system of claim 15, further comprising:
a control circuit coupled to the regulating circuit, wherein the control circuit is to clamp the first voltage and the second voltage to half of the first device voltage, wherein the first device voltage is higher than the second device voltage.

* * * * *

UNITED STATES PATENT AND TRADEMARK OFFICE
CERTIFICATE OF CORRECTION

PATENT NO. : 9,768,709 B2
APPLICATION NO. : 13/283952
DATED : September 19, 2017
INVENTOR(S) : Thomas P. Sawyers Page 1 of 1

It is certified that error appears in the above-identified patent and that said Letters Patent is hereby corrected as shown below:

In the Claims

In Column 7, Line 50, in Claim 1, delete "transformer to;" and insert -- transformer to: -- therefor.

In Column 8, Line 67, in Claim 15, delete "circuit to;" and insert -- circuit to: -- therefor.

In Column 9, Line 21, in Claim 19, delete "a wherein" and insert -- wherein -- therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*